United States Patent
Masi et al.

(10) Patent No.: US 6,831,135 B2
(45) Date of Patent: Dec. 14, 2004

(54) PROCESS FOR THE HYDROGENATION OF HOMOPOLYMERS AND COPOLYMERS OF CONJUGATED DIENES

(75) Inventors: Francesco Masi, Sant'Angelo Lodigiano (IT); Anna Sommazzi, Santa Margherita Ligure (IT); Roberto Santi, Novara (IT)

(73) Assignees: ENI S.p.A., Rome (IT); Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/668,288

(22) Filed: Sep. 24, 2003

(65) Prior Publication Data

US 2004/0132917 A1 Jul. 8, 2004

(30) Foreign Application Priority Data

Sep. 27, 2002 (IT) ..................... MI2002A2055

(51) Int. Cl.[7] .............................. C08F 8/04; B01J 31/22
(52) U.S. Cl. ........................................ 525/338; 502/152
(58) Field of Search ........................... 502/152; 525/338

(56) References Cited

U.S. PATENT DOCUMENTS

| 5,679,816 A | 10/1997 | Timmers et al. |
| 6,184,316 B1 | 2/2001 | Masi et al. |

FOREIGN PATENT DOCUMENTS

| EP | 0 471 415 A1 | 2/1992 |
| EP | 0 974 602 A1 | 1/2000 |
| WO | WO 00/25915 | 5/2000 |

*Primary Examiner*—Caixia Lu
(74) *Attorney, Agent, or Firm*—Oblon, Spivak, McClelland, Maier & Neustadt, P.C.

(57) ABSTRACT

A process is described for the hydrogenation of olefin double bonds present in polymers and copolymers of conjugated dienes, which comprises putting the above polymer or copolymer of conjugated dienes in contact with hydrogen in an inert solvent, in the presence of a catalytic system, characterized in that the above catalytic system essentially consists of one or more titanium compounds selected from those having general formula (I)

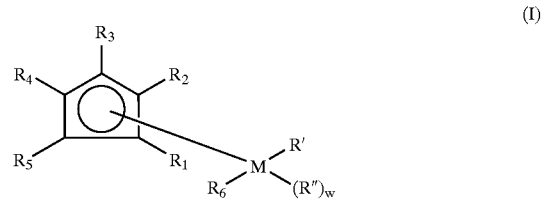

(I)

wherein:

M is selected from Ti(III) and Ti(IV) and their mixtures.

25 Claims, No Drawings

PROCESS FOR THE HYDROGENATION OF HOMOPOLYMERS AND COPOLYMERS OF CONJUGATED DIENES

The present invention relates to a process for the selective hydrogenation of olefin double bonds present in homopolymers and copolymers of conjugated dienes.

Polymers obtained through the polymerization or copolymerization of conjugated dienes are widely used on industrial scale.

These (co)polymers have, in the polymeric chain, olefin double bonds which, although useful when vulcanization processes are effected, are responsible for a low resistance to stability, and particularly to oxidation.

In particular, the block copolymers obtained from conjugated dienes and vinyl-substituted aromatic hydrocarbons, are used in non-vulcanized form, as thermoplastic elastomers or impact strength transparent resins or modifiers of styrene or olefin resins. The above block copolymers have a low resistance to oxidation, ozone and atmospheric aging, due to the presence of olefin double bonds in the polymeric chain. This creates a great drawback for their application.

This low stability can be greatly reduced by the selective hydrogenation of the olefin double bonds of the above copolymers.

The known methods for the hydrogenation of polymers having olefin double bonds are based on (1) heterogeneous catalysts supported on inert carriers (for example, silica, alumina, carbon) on which a metal (for example nickel, palladium, platinum) is deposited and (2) non-supported heterogeneous catalysts obtained by reacting an organometallic compound of nickel, cobalt, titanium or the like, with a reducing compound such as an organo-aluminum, an organo-magnesium or an organo-lithium.

With respect to the supported heterogeneous catalysts (1), the non-supported catalysts (2) have the advantage of a higher reactivity. This is a great advantage, as it is possible to operate under lighter conditions and with lower quantities of catalyst.

U.S. Pat. No. 4,501,857 describes a hydrogenation process of non-living polymers carried out in the presence of (A) a titanium bis-(cyclopentadienyl) derivative and (B) at least one organo-lithium derivative, the molar ratio between the lithium atoms and titanium atoms being 0.1/1 to 100/1.

EP-A-434,469 describes a catalytic composition which comprises at least one titanium bis-(cyclopentadienyl) derivative and at least one compound selected from those of general formula (i) $M^2$ ($AlR^3R^4R^5R^6$) and (ii) $M^2$ ($MgR^3R^4R^6$) wherein $M^2$ is selected from lithium, sodium and potassium. Compound (i) can be obtained by reacting an organo-alkaline compound with an organo-aluminum compound, whereas compound (ii) can be obtained by reacting an organo-alkaline compound with an organo-magnesium derivative.

EP-A-601,953 describes a hydrogenation process carried out in the presence of a catalyst of general formula $Cp_2Ti(PhOR)_2$ or $CP_2Ti(CH_2PPh_2)_2$.

All these processes have various drawbacks. The process described in U.S. Pat. No. 4,501,857 is the simplest as it starts from a compound (titanium dicyclopentadienyl chloride) which is easily available on the market and involves only the addition of an organic lithium derivative. Unfortunately, the same data of this patent show that the process is very effective when applied to living polymers, but gives a low hydrogenation yield when applied to non-living polymers (see table III compared with table II).

EP-A-434,469, on the other hand, comprises the presence of compounds (i) and (ii), which require reaction, not included in U.S. Pat. No. 4,501,857, between an organo-alkaline derivative (usually an organo-lithium derivative) and an organo-aluminum or an organo-magnesium derivative, with the titanium compound. Similarly, the process described in EP-A-601,953 is also onerous, as it includes the preparation and isolation of particular titanium dicyclopentadienyl derivatives obtained starting from $Cp_2TiCl_2$.

In any case, all of the catalysts described above, have the disadvantage of being prepared in situ and not being stable to storage.

A hydrogenation process of olefin double bonds has now been found, which overcome the above drawbacks.

In accordance with this, the present invention relates to a process for the hydrogenation of olefin double bonds present in polymers and copolymers of conjugated dienes, which comprises putting the above polymer or copolymer of conjugated dienes in contact with hydrogen in an inert solvent, in the presence of a catalytic system, characterized in that the above catalytic system essentially consists of one or more titanium compounds selected from those having general formula (I)

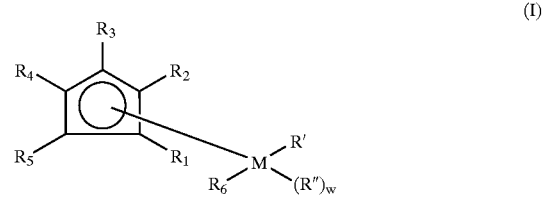

(I)

wherein:

M is selected from Ti(III) and Ti(IV) and the relative mixtures;

R" is selected from (i) an organic or inorganic radical of an anionic nature, different from cyclopentadienyl or cyclopentadienyl substituted, (ii) an oligomeric group having general formula (II);

the groups $R_1$, $R_2$, $R_3$, $R_4$, $R_5$, each independently represent, atoms or radicals bound to the cyclopentadienyl group coordinated to the metal M, and are selected from hydrogen and any other suitable organic or inorganic substituent of said cyclopentadienyl group;

$R_6$ is selected from: (a) an inorganic anion, (b) a hydrocarbyl having from 1 to 20 carbon atoms, (c) R', preferably selected from: cyclopentadiene, cyclopentadiene substituted, R';

"w" has the value of 0 or 1, according to the valence of the titanium;

R' consists of an oligomeric group having the following formula (II):

$$-(A_xD_yU_z)R'$$ (II)

wherein:

A represents any monomeric unit deriving from a vinylaromatic group polymerizable by means of anionic polymerization, having from 6 to 20 carbon atoms;

D represents any monomeric unit deriving from a conjugated diolefin polymerizable by means of anionic polymerization, having from 4 to 20 carbon atoms;

U represents any generic optional monomeric unit deriving from an unsaturated compound co-polymerizable with any of the above conjugated diolefins D or vinylaromatic compounds A;

R' represents a hydrocarbyl group having from 1 to 20 carbon atoms, each index "x" and "y" can be independently zero or an integer, provided the sum (x+y) is equal to or higher than 2, preferably between 2 and 50, even more preferably between 2 and 25:

"z" can be zero or an integer ranging from 1 to 20.

The preparation of the compounds having general formula (I) is explained in the pending patent application in the name of the same applicant. The experimental part describes the preparation of some compounds having general formula (I) subsequently used in hydrogenation tests.

The term "suitable"—as used in the text and claims with reference to groups, radicals and substituents in the formula of organic and organometallic compounds—means that those groups, radicals and substituents are compatible with the stability characteristics of said compounds in the pure state, i.e. substantially inert towards any part of the molecule under examination, on the basis of the chemical reactivity characteristics generally known to average experts in the field.

The term "derivative" as used herein with reference to the monomeric units present in general formula (I), means the production of said units in accordance with one of the known anionic poly-addition reactions, both with a 1–2 mechanism and, when possible, with a 1–4 mechanism. The monomeric units thus obtained substantially have the same structure as the monomer from which they derive, but one unsaturation less, and are linked with a covalent bond to each end of the oligomeric chain.

The complex having formula (I), according to the present invention, is a metallocene complex of trivalent or tetravalent Titanium, and is characterized by a higher stability both in solution and in the pure state.

Without limiting the present invention in any way to any particular theory or interpretation, it is believed that the favorable and surprising characteristics of said complexes having formula (I), with respect to the mono- or bis-metallocene complexes of the known art, can be specifically attributed to the presence of at least one unsaturated group having formula (II) bound to metal M.

In accordance with the previous definition of the complex having formula (I), the metal M is selected from titanium (III) and titanium (IV).

In accordance with the widest interpretation of the present invention, the group R', schematically represented by the above formula (II), is an unsaturated group consisting of numerous monomeric units of type A and/or type D, and possibly U, as specified above, without any limitation of formula or chain sequence. In this sense, said formula (II) should be interpreted in its most general meaning of the empirical formula of said oligomeric group, without any limitation with respect to the sequence of said monomeric units or groups of monomeric units. Furthermore, as said oligomeric groups having formula (II) can be obtained through anionic polymerization under controlled conditions, said formula (II) should necessarily be interpreted, according to standard practice, as representing a mixture of compounds deriving from a polymerization process and consequently having a varying number of units, distributed around an average value which constitutes the average polymerization degree. The unsaturations can be of the olefinic type, in the monomeric units D deriving from a diene, or of the aromatic type, in the units A deriving from a vinylaromatic compound.

Oligomeric groups having formula (II) according to the present invention, can consist of a single block of two or more D units in sequence, resulting from a single conjugated diolefin, possibly partially polymerized with a 1–4 mechanism and partially with a 1–2 mechanism, according to what is known from the anionic polymerization technique, or a single block of two or more A units in sequence, resulting from a single vinylaromatic compound.

Oligomeric groups consisting of at least two monomeric units A or at least two monomeric units D, different from each other, deriving from two or more conjugated diolefins or two or more vinylaromatic compounds, are also included in formula (II).

Oligomeric groups consisting of at least one monomeric unit D deriving from a conjugated diolefin, at least one monomeric unit A deriving from a vinylaromatic compound, and possibly at least one co-polymerizable unit U, are also included in formula (II). Said oligomeric groups can have a statistic distribution of the different monomeric units, or can consist of more or less homogeneous blocks of A or D or U units, bound to each other.

According to a particular aspect of the present invention, said formula (II) represents a block oligomer, preferably a di-block oligomer, wherein there is a first block consisting of D units only, bound to each other, bound, in turn, to a second block essentially consisting of A units only. It is also possible to obtain three-block structures—by means of particular methods, known in the art of anionic polymerization for obtaining elastomers—one of A units alone, one of D units alone and the third comprising A and D units in statistical sequence (called "tapered", according to the known art). The sequence with which the blocks are linked to each other and to the metal M and to the group R', respectively, at the ends, can be easily selected by the average expert, on the basis of the polymerization techniques available, as can be seen hereafter. The block D is preferably linked to the metal M.

Typical diolefins which can be anionically polymerized through to form monomeric units of the D type, are 1,3-diolefins having from 4 to 20 carbon atoms, preferably from 4 to 10, such as, for example, 1,3-butadiene, isoprene, chloroprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene, 1,3-cyclohexadiene.

Compounds wherein a group of an aromatic nature (also hetero-aromatic) is bound in a position to a vinyl group, i.e. a primary olefin group, such as styrene, 4-ter-butylstyrene, alfa-methylstyrene, o-methylstyrene, p-methylstyrene, vinylnaphthalene, 2-vinylfurane and 2-vinylpiridine, are typical vinylaromatic compounds which can be polymerized by means of anionic polymerization to form monomeric units of the A type. Hydrocarbyl derivatives having from 8 to 15 carbon atoms are preferred vinylaromatic derivatives.

Acrylic and methacrylic esters, such as methyl methacrylate, are, for example, typical compounds which can be co-polymerized with the previous ones, to form monomeric units of the U type.

Particularly preferred R' groups are those wherein the sum of the indexes (x+y+z) ranges from 2 to 15. According to a particular aspect, "z" is equal to zero and (x+y) is between 2 and 15. According to another particular aspect, "x" and "z" are both zero and said R' group consists of an oligomer of a conjugated diene having an average polymerization degree from 2 to 15.

The R' group in formula (II) represents an aliphatic, cycloaliphatic, aromatic or alkyl aromatic group having from 1 to 20, preferably from 2 to 10, more preferably from 3 to 6, carbon atoms and derives from the organic residue of the polymerization initiator in the preparation process of said oligomeric group having formula (II). Typical, non-limiting, examples of the $R'$ group are: tert-butyl, n-butyl, isopropyl, n-hexyl, cyclohexyl, benzyl, phenyl, toluyl.

The group R" in formula (I) can have any of the general or specific meanings normally attributed to it in technical literature of the field, with reference to a non-cyclopentadienyl substituent of the metal M in a metallocene complex. It can therefore be inorganic or organic, of a more or less anionic nature, according to the relative electronegative characteristics of the atoms of which it consists. A second chain-end of said group can also be bound to the $R_6$ group in formula (I), to form, as a whole, a cyclic structure including the metal M as, for example, in the case of a divalent tetramethylene —$(CH_2)_4$— group, or the 1,4-tetramethylenedioxy —O—$(CH_2)_4$—O— group.

Non-limiting examples of substituent groups that can be represented in this case by R" are: hydrogen, halogen such as chorine or bromine, a $C_1$–$C_{20}$ alkyl or alkyl aryl group, a $C_3$–$C_{20}$ allyl group, a $C_3$–$C_{20}$ alkyl silyl group, a $C_5$–$C_{20}$ cycloalkyl group, a $C_6$–$C_{20}$ aryl or aryl alkyl group, a $C_1$–$C_{20}$ alkoxide or thioalkoxide group, a $C_2$–$C_{20}$ carboxylate or carbamate group, a $C_2$–$C_{20}$ dialkylamide group, a $C_4$–$C_{20}$ alkylsilylamide group. Typical examples are: hydride, halide, preferably chloride or bromide, a linear or branched alkyl group such as methyl, ethyl, butyl isopropyl, isoamyl, octyl, decyl, benzyl, an alkyl silyl group such as, for example, trimethyl silyl, triethyl silyl or tributyl silyl, a cycloalkyl group, such as cyclopentyl, cyclohexyl, 4-methyl cyclohexyl, an aryl group, such as phenyl or toluyl, an alkoxyl or thioalkoxyl group such as methoxyl, ethoxyl, iso- or sec-butoxyl, ethyl sulfide, a carboxylate group such as acetate, trifluoro acetate, propionate, butyrate, stearate, benzoate, and also a dialkylamide group, such as diethyl amide, dibutyl amide or alkylsilyl amide, such as bis (trimethyl silyl)amide or ethyl trimethyl silylamide.

Among the above products, the chlorine group and alkyl, alkoxide, carboxylate, alkyl amide and alkyl silyl organic groups having from 1 to 20 carbon atoms, are preferred.

According to a different preferred aspect of the present invention, both the R' and R" groups are independently oligomeric groups having formula (II).

According to another aspect of the present invention (i.e. when the Titanium is tetravalent), the R', R" and $R_6$ groups can be selected from the oligomeric groups having formula (II).

The two groups R' and R" can represent two different groups having formula (II), bound to the same metal M, or, preferably, can substantially have the same formula. When necessary, said complexes can also include the two groups R' and R", having, in common, the same terminal group $R'$, so as to form a cyclic structure with the metal M. Complexes of this type can be obtained starting from a live dianionic group, as better specified hereunder.

Each of the above atoms or radicals $R_1$, $R_2$, $R_3$, $R_4$, and $R_5$, bound to the $\eta^5$-cyclopentadienyl group in the complex having formula (I), can be independently hydrogen, halogen or any hydrocarbyl group having from 1 to 20, preferably from 1 to 10, carbon atoms, when required substituted with suitable heteroatoms such as, for example, Si, Ge, O, F, Cl or Br. Typical, non-limiting examples of said radicals are hydrogen, methyl, ethyl, propyl, isopropyl, butyl, sec-butyl, isobutyl, tert-butyl, hexyl, 2-ethylbutyl, octyl, decyl, dodecyl, hexadecyl, octadecyl, cyclohexyl, methyl cyclohexyl, ethyl cyclohexyl, 2,4,6-trimethyl cyclohexyl, octyl cyclohexyl, phenyl, methyl-phenyl, ethyl-phenyl, biphenyl, 2,4,6-trimethyl phenyl, octyl-phenyl, benzyl, 4-methyl benzyl, biphenyl methyl, trifluoro methyl, per-fluoro ethyl, pentafluoro phenyl, 3,4,5-trifluoro phenyl, dichloro phenyl, chlorofluoro phenyl, trichloro methyl, 2-methoxyethyl, 2-trifluoromethyloxy-ethyl, 4-methoxyphenyl and 4-ethoxyphenyl, trimethyl silyl, triethyl silyl.

Moreover, as is already known in literature for other cyclopentadienyl complexes of metals of group 4 of the periodic table, two or even more of said radicals having a suitable structure can be bound to each other to give a cyclic or also polycyclic, saturated, unsaturated or aromatic structure, with at least one bond in common ("condensed" according to the term normally used) with said cyclopentadienyl ring. Indenyl and fluorenyl groups, possibly further substituted, and the corresponding groups obtained by hydrogenation of their aromatic rings, are non-limiting examples of said condensed cyclic structures, in accordance with the present invention. Indenyl, fluorenyl, 4,5,6,7-tetrahydroindenyl, 1,3-dimethyl-4,5,6,7-tetrahydroindenyl, 1,2,3-trimethyl indenyl octahydrofluorenyl, the benzocycloalkyl pentadienyl groups described in Italian patent application Nr. MI00A000680, are typical, non-limiting examples.

Furthermore, according to the present invention, any radical or condensed group bound to the $\eta^5$-cyclopentadienyl group present in the compound having general formula (I), can be, in turn, bound, by means of a covalent bond, to said $R_6$ group, to form a so-called "bridged" cyclic structure, according to the usual wording used in the field, which also comprises said metal M in the cycle.

Said $R_6$ group, according to the present invention, represents, in its more general form, a hydride, or any organic or inorganic group of an anionic nature, bound to the metal M, analogously to the usual definition of a generic binder of the metal in a metallocene complex. $R_6$ can therefore be, for example, hydrogen, a halogen or an alkyl, cycloalkyl, aryl, alkoxy, aryloxy, amide or carboxy group having from 1 to 30, preferably 1 to 20, carbon atoms.

According to a particular aspect of the present invention, said $R_6$ comprises a cyclopentadienyl group, bound to the metal M, and can also be optionally bound, by means of a covalent bond, to the cyclopentadienyl group having general formula (I), preferably as a substitute for the $R_1$ group, to form, as already mentioned, a bridged cyclic structure.

In particular, said $R_6$ group can have the following formula (III):

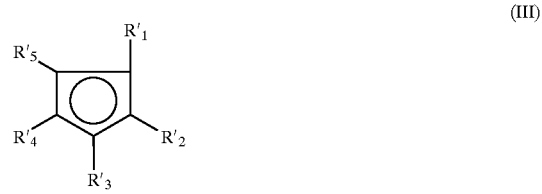

(III)

wherein each of the different groups $R'_1$, $R'_2$, $R'_3$, $R'_4$, $R'_5$, is independently selected from hydrogen or any alkyl, aryl or silyl radical, having from 1 to 20, preferably from 1 to 10, carbon atoms and possibly containing one or more heteroatoms selected from halogen, oxygen, sulfur, silicon or germanium, or any two of said groups, suitably close to each other, can be bound by means of a covalent bond to form a cyclic structure, and the group $R'_1$ of the cyclopentadienyl group having formula (III), can be bound, if necessary, to the cyclopentadienyl group having general formula (I), by means of a covalent bond, in substitution of the $R_1$ group, to form a so-called "bridged" cyclic structure, according to the standard wording, which also includes in the cycle said metal atom M having formula (I).

Said "bridged" structure, normally has from 1 to 20 carbon atoms and can also include heteroatoms such as Si and Ge, substituted with 2 alkyl radicals. Typical bridged structures known in the art are methylene, dimethylsilylene, 1,2-ethylene, 1,4-butylene, xylylene, etc.

Non-limiting examples of $R'_1$, $R'_2$, $R'_3$, $R'_4$, $R'_5$ groups are hydrogen, methyl, ethyl, propyl, isopropyl, butyl, sec-butyl, isobutyl, tert-butyl, hexyl, 2-ethylbutyl, octyl, decyl, dodecyl, hexadecyl, octadecyl, cyclohexyl, methylcyclohexyl, ethylcyclohexyl, 2,4,6-trimethylcyclohexyl, octylcyclohexyl, phenyl, methyl phenyl, ethyl phenyl, biphenyl, 2,4,6-trimethylphenyl, octyl phenyl, benzyl, 4-methyl benzyl, biphenyl methyl, trifluoro methyl, perfluoro ethyl, pentafluoro phenyl, 3,4,5-trifluoro phenyl, dichloro phenyl, chlorofluoro phenyl, trichloro methyl, 2-methoxy ethyl, 2-trifluoro methyloxy ethyl, 4-methoxy phenyl, 4-ethoxy phenyl, trimethyl silyl, triethyl silyl.

In the particular case in which $R'_1$ forms a bridged structure with the cyclopentadienyl group present in general formula (I), the same consists of an organic divalent group, possibly also including heteroatoms suitably bound to carbon atoms, as those mentioned above. Typical, non-limiting examples of said groups are methylene, 1,2-ethylene, 1,3-propylene, 1,4-butylene, 1,4-but-2-enylene, dimethyl silylene, diethyl silylene, 1,2-tetramethyl disilylene, 1,2-xylylene, 1,3-xylylene, 1,2-phenylene methylene, dimethyl germilene, 1,3-cyclohexylene.

According to another aspect of the present invention, $R_6$ represents an organic group bound to the metal M through an atom selected from N, P, O or S, for example any amide group having the formula $R_7R_8N$—, phosphide having the formula $R_7R_8P$—, oxy having the formula $R_7O$—, thio having the formula $R_7S$—, in which said $R_7$ and $R_8$ groups can have any of the above meanings specified for any of the groups $R'_1$, $R'_2$, $R'_3$, $R'_4$, $R'_5$. Those in which the $R_7$ group is a bivalent group, preferably having from 1 to 5 carbon atoms, bridged to said first cyclopentadienyl group in formula (I), in substitution of $R_1$, have probed to be of particular interest among the above-mentioned groups.

Non limiting examples of complexes having formula (I) used in the process of the present invention, are:

$Cp_2Ti [(C_5H_8)_2C_4H_9]$ (MW=371.42)
$Cp*Ti [(C_5H_8)_2C_4H_9]_3$ (MW=763)
$Cp_2Ti [(C_5H_8)_5C_4H_9]$ (MW=575.78)
$Cp_2Ti [(C_8H_8)_5C_4H_9]$ (MW=755.94)
$Cp_2Ti [(C_4H_6)_5C_4H_9]$ (MW=505.64).

It has been surprisingly found that the compounds having general formula (I) are active in the hydrogenation process of the present invention also in the absence of organo-derivatives of aluminum and/or magnesium. This is a further significant advantage, as it greatly simplifies the reaction system.

It is possible, however, to operate in the presence of small quantities of the well-known "scavengers", i.e. substances able to react with impurities (mainly protic substances, water, for example), which are normally present in varying quantities in the hydrogenation system, particularly in the solvent. The above scavengers are usually selected from hydrocarbyl derivatives of Mg, Zn, Sn, Al. Aluminum alkyl derivatives, in particular $Al(i-C_4H_9)_3$, have proved to be particularly suitable for the purpose. It is advisable however not to exceed in the quantities of the above scavengers, as excesses of these scavengers can slow down the hydrogenation process. The maximum amount of scavenger is 1 mmole/l (see also experimental part).

The hydrogenation reaction of the (co)polymers to be hydrogenated is carried out at a temperature ranging from 20° C. to 200° C., preferably from 70° C. to 160° C., and at a pressure of 1 to 50 bars. As far as the solvent is concerned, this is preferably selected from saturated aliphatic or cycloaliphatic hydrocarbons and their mixtures.

According to an embodiment, the solution of the (co)polymer to be hydrogenated is charged into the reaction reactor, under a hydrogen atmosphere, and subsequently the solution of catalyst having general formula (I). The whole mixture is pressurized with hydrogen and brought to the desired temperature. Once the hydrogenation is complete, the hydrogenated polymer is recovered according to the known techniques (for example, vapor stripping, polymer coagulation).

As an alternative, the solution to be hydrogenated can be first heated to the desired temperature and the catalyst solution then added. The subsequent operations are the same.

The process of the present invention can also be carried out in the presence of very low quantities of catalyst, more or less from 50 to 150 ppm of titanium with respect to the (co)polymer to be hydrogenated, with a ratio between titanium moles and olefin double bonds of up to 1/60,000.

The process of the present invention can be applied to the hydrogenation of any polymer or copolymer containing olefin double bonds, preferably (co)polymers of conjugated dienes, obtained by the polymerization or copolymerization of conjugated dienes with a from 4 to 12 carbon atoms.

The (co)polymers of conjugated dienes include homopolymers of conjugated dienes, interpolymers of different conjugated dienes and copolymers obtained by copolymerizing at least one conjugated diene with at least one olefin which can be co-polymerized with the above conjugated diene.

Typical examples of conjugated dienes are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene.

Isoprene and 1,3-butadiene, more preferably 1,3-butadiene, are particularly suitable as intermediates for the production of elastomers having excellent physico-chemical properties. Polybutadiene, polyisoprene and butadiene/isoprene copolymers are consequently typical examples of homopolymers which can be used in the process of the present invention.

Olefin monomers which can be used in the copolymerization, together with the above dienes, are all unsaturated monomers which can be copolymerized with the above conjugated dienes, particularly vinyl-substituted aromatic hydrocarbons. Among these, styrene, tert-butyl styrene, alpha-methyl styrene, o-methyl styrene, p-methyl styrene, vinyl naphthalene are particularly suitable. In particular, styrene is the most useful vinyl aromatic compound.

Typical examples of block copolymers which can be used in the hydrogenation process of the present invention are those having the general formula $(B-T-A-B)_nX$ and $(A-T-B)_nX$, wherein B are polydiene blocks, the same or different, A is a polyvinyl aromatic block, T is a co-polymeric statistical segment made up of diene and vinyl aromatic units, X is a coupling radical with a valence n, wherein n is an integer from 1 to 20, the content of the T segment being 0 to 40% by weight. When n is 1, X is the residue of a quenching agent, for example —Si—$(CH_3)_3$, if monochlorotrimethylsilane is used as quenching agent. When n is 2 or over, X is the residue of a coupling agent, such as, for example, =$Si(CH_3)_2$, in the case of dimethylchlorosilane, =$Si(CH_3)$ in the case of methylchlorosilane, and =Si= in the case of silicon tetrachloride.

In the above block copolymers, the content of vinyl-substituted aromatic hydrocarbons ranges from 5 to 95%, preferably 10 to 60%. In the above copolymers the content of 1,2 or 3,4 units of the polydiene phase can vary from 10 to 80%.

With the process of the present invention, it is also possible to hydrogenate, in addition to the above styrene-diene block copolymers, random copolymers having a linear or branched structure, with monomers statistically distributed in the polymeric chain and contents of 1,2 or 3,4 units varying from 10 to 80%.

The (co)polymers which can be used in the present invention are not particularly distinguishable from a molecular weight point of view. Nevertheless, they normally have a number average molecular weight ranging from 1,000 to about 1 million.

The copolymers which can be used in the present invention can be produced by means of any method described in the prior art, for example by anionic polymerization and polymerization through organometallic complexes. The above (co)polymers are preferably prepared by means of anionic polymerization in the presence of at least one organic compound having at least one lithium atom in the molecule. Examples of these organic compounds of lithium are n-propyl lithium, isopropyl lithium, n-butyl lithium, sec-butyl lithium, tert-butyl lithium, n-pentyl lithium, benzyl lithium, 1,4-dilithium-n-butane, 1,5-dilithium-pentane, 1,2-dilithium-diphenyl ethane.

If the polymerization has been carried out by means of the anionic polymerization technique, the process of the present invention can be effected both with living (co)polymers and with coupled or de-activated (co)polymers.

The following examples are provided for a better understanding of the present invention.

EXAMPLES

Preparation of Titanium Complexes
Preparation of the Complex A (20476/1)

In a typical experiment, 1.65 ml (2.8 mmoles) of a 1.7 M solution of t-butyllithium in pentane are charged, under stirring, into a test-tube containing 2 ml of dry cyclohexane. 0.38 g (5.6 mmoles) of isoprene, freshly distilled on NaH, are then added dropwise to the solution, the whole mixture being maintained under stirring. 0.6 g (2.8 mmoles) of bis(cyclopentadienyl)titanium(III)chloride [formula $Cp_2TiCl$ ($Cp=C_5H_5$)] (prepared according to what is described in literature: Inorganic Synthesis vol 21, p. 84) dissolved in toluene (40 ml), are slowly added to the solution. The whole solution is left under stirring for 2 hrs. The colour changes from red to purple. The solution is filtered on a G4 porous septum and the solvent is then removed by evaporation under the vacuum of a mechanical pump, obtaining 1 g of a purple-coloured solid, which, after characterization, proved to essentially consist of the complex bis($\eta^5$-cyclopentadienyl)Ti (polyisoprenyl) with an average polymerization degree of isoprene of 2.

Elemental analysis for $Cp_2Ti[(C_5H_8)_2C_4H_9]$ (MW=371.42):

Theoretical: Ti=12.89% by weight
Found: Ti=12.80% by weight.

Preparation of the Complex B (20476/25)

In a typical experiment, 3.2 ml (4.815 mmoles) of a 1.5 M solution of t-butyllithium in pentane are charged, under stirring, into a test-tube containing 3.4 ml of dry cyclohexane. 0.655 g (9.6 mmoles) of isoprene, freshly distilled on NaH, are added dropwise to the solution, the whole mixture being maintained under stirring.

0.55 g (2.2 mmoles) of $Cp_2TiCl_2$ dissolved in toluene (25 ml), are slowly added to the solution. The solution is left under stirring overnight. The colour changes from red to purple. The solution is filtered on a G4 porous septum and the solvent is then removed by evaporation under the vacuum of a mechanical pump, obtaining 0.8 g of a purple-coloured solid, which, after characterization, proved to essentially consist of the complex bis($\eta^5$-cyclopentadienyl)Ti (polyisoprenyl) with an average polymerization degree of the isoprene of 2, essentially analogous to complex A obtained in accordance with the previous example. It was determined, by means of EPR measurements, that the whole Titanium is in oxidation state (III). It is believed that, during the preparation reaction, the Titanium is reduced from oxidation state (IV) to state (III) through β-elimination, analogously to what is normally already known with respect to titanium dialkyl cyclopentadienyl complexes.

Elemental analysis for $Cp_2Ti[(C_5H_8)_2C_4H_9]$ (MW=371.42):

Theoretical: Ti=12.89% by weight
Found: Ti=12.79% by weight.

Ti(III)=100% molar, calculated by means of EPR measurements. The EPR characterization was carried out using a Brucker ESP300E spectrophotometer. The sample solutions were analyzed as such, by simple transfer into the sample-holder at room temperature.

Preparation of the Complex C (20450/68)

In a typical experiment, 3.2 ml (4.8 mmoles) of a 1.5 M solution of t-butyllithium in pentane are charged, under stirring, into a test-tube containing 3.4 ml of dry cyclohexane. 0.655 g (9.6 mmoles) of isoprene, freshly distilled on NaH, are added dropwise to the solution, the whole mixture being maintained under stirring.

0.55 g (2.2 mmoles) of $Cp_2TiCl_2$ dissolved in toluene (25 ml), are slowly added to the solution, cooled with a water bath and ice to about 10° C. and repaired from the light with aluminum foil. The solution is left under stirring overnight. The colour changes from red to dark brown. The solution is filtered on a G4 porous septum and the solvent is then removed by evaporation under the vacuum of a mechanical pump, obtaining 0.9 g of a brown-coloured oily solid, which, after characterization by means of EPR and $^1$HNMR measurements, proved to essentially consist of the complex bis($\eta^5$-cyclopenta-dienyl)Ti(IV) (polyisoprenyl)$_2$, with about 5% of the corresponding complex Ti(III), in which the isoprenyl group has an average polymerization degree of 2. The running of the reaction at a low temperature and with photo-shielding, allowed the inhibition of the β-elimination reaction, prevalently obtaining the desired Ti (IV) complex.

Elemental analysis: Ti=8.7% by weight
Ti(III)=5% molar (calculated by means of EPR measurements) with respect to the total Titanium.

Preparation of the Complex D (20476/20)

In a typical experiment, 3.35 ml (5.7 mmoles) of a 1.7 M solution of t-butyllithium in pentane are charged, under stirring, into a test-tube containing 4 ml of dry cyclohexane. 0.78 g (11.4 mmoles) of isoprene, freshly distilled on NaH, are added dropwise to the solution, the whole mixture being maintained under stirring.

0.55 g (1.9 mmoles) of Cp*TiCl$_3$ dissolved in toluene (15 ml), are slowly added to the solution. The mixture is left under stirring overnight. The solution is filtered on a G4 porous septum and the solvent is then removed by evaporation under the vacuum of a mechanical pump, obtaining 1.3 g of a brown-coloured solid, which, after characterization, proved to essentially consist of the complex tris(Cp*)Ti (polyisoprenyl)$_3$.

Elemental analysis for Cp*Ti[(C$_5$H$_8$)$_2$C$_4$H$_9$]$_3$ (MW=763):
Theoretical: Ti=6.27%
Found: Ti=6.0%.

Preparation of the Complex E

In a typical experiment, 1.65 ml (2.8 mmoles) of a 1.7 M solution of t-butyllithium in pentane are charged, under stirring, into a test-tube containing 2 ml of dry cyclohexane. 0.95 g (14 mmoles) of isoprene, freshly distilled on NaH, are added dropwise to the solution, the whole mixture being maintained under stirring.

0.6 g (2.8 mmoles) of $Cp_2TiCl$ (prepared according to what is described in literature: Inorganic Synthesis vol 21, page 84) dissolved in toluene (40 ml), are slowly added to the solution. The solution is left under stirring for 2 hrs. It is filtered on a G4 porous septum and the solvent is then removed by evaporation under the vacuum of a mechanical pump, obtaining 1.55 g of an oily solid, which, after characterization, proved to essentially consist of the complex $(Cp)_2Ti$ (polyisoprenyl), with an average polymerization degree of isoprene of 5.

Elemental analysis for $Cp_2Ti[(C_5H_8)_5C_4H_9]$ (MW=575.78):

Theoretical: Ti=8.32%
Found: Ti=8.3%.

Preparation of the Complex F 2.55 ml (4 mmoles) of a 1.57 M solution of t-butyllithium in pentane are charged, under stirring, into a test-tube containing 6.8 ml of dry cyclohexane and 2.29 ml (20 mmoles) of styrene, freshly distilled on CaH (styrene/Li=5). The whole mixture is maintained under stirring for about 2 hours.

0.85 g (4 mmoles) of $(Cp)_2TiCl$ (Li-R/Ti=1) suspended in toluene (about 25 ml) are slowly added to the solution. The solution is left under stirring for 5 hours and is filtered on a porous septum (G4), in an inert atmosphere. The filtrate is evaporated under the vacuum of a mechanical pump, obtaining about 3 g of an oily solid, which, after characterization, proved to essentially consist of the complex $(Cp)_2Ti$ (polystyryl) with an average polymerization degree of styrene equal to 5.

Elemental analysis for $(C_5H_5)_2Ti[(C_8H_8)_5C_4H_9]$ (MW=755.94)

Theoretical: Ti=6.33% by weight
Found: Ti=6.2% by weight.

Preparation of the Complex G 2 ml of butadiene, dried by passage through a column filled with molecular sieves, are condensed in a schlenk tube kept at −20° C. 8.5 ml of cyclohexane are then added to the butadiene. 3 ml (4.8 mmoles) of a 1.57 M solution of t-butyllithium in pentane are then charged, under stirring, into the reactor brought to room temperature. The solution is left under stirring for about two hours.

1.025 g (4.8 mmoles) of $Cp_2TiCl$ (Li-R/Ti=1) suspended in toluene (about 25 ml), are slowly added to the solution. The solution is left under stirring for 5 hrs. It is filtered on a porous septum (G4) and the filtrate is then evaporated under the vacuum of a mechanical pump, obtaining about 2 g of an oily solid, which, after characterization, proved to essentially consist of the complex $(Cp)_2Ti$ (polybutadienyl), with an average polymerization degree of butadiene of 5.

Elemental analysis for $(C_5H_5)_2Ti[(C_4H_6)_5C_4H_9]$ (MW=505.64)

Theoretical: Ti=9.47% by weight
Found: Ti=9.53% by weight.

Preparation of the Catalyst

The catalyst, in the desired quantity, and 10 ml of dry cyclohexane (HPCL grade, anhydrified by distillation on $LiAlH_4$ with a water content $H_2O \leq 2$ ppm) are charged, under an argon atmosphere and under stirring, into a Schlenk tube, in which 3 vacuum/argon cycles have been previously effected.

The water measurement was obtained by means of a Karl-Fisher titrator of Mettler Toledo DL37.

1) Hydrogenation Reaction of Non-Quenched SBS Rubbers

An SBS polymeric solution in cyclohexane (with the following characteristics: percentage composition styrene butadiene 30/70 by weight, vinyl content 40% and Mw 70,000) obtained by anionic polymerization, according to the methods well known in the state of the art, is transferred as such and without quenching, into a 1 liter steel reactor of the Buchi type. The mixture is stirred at 1,000 rpm. Hydrogen is then charged at a pressure of 4 bars and the temperature is thermostat-regulated at the desired value. The catalyst, dissolved in 10 ml of dry cyclohexane (anhydrified by distillation on $LiAlH_4$) is introduced into the reactor, in the amount specified in Table 1. The hydrogen pressure in the reactor is brought to the desired value. The results obtained are listed in Table 1.

2) Hydrogenation Reaction of SBS Rubbers

An SBS rubber solution (with the following characteristics: percentage composition styrene butadiene 30/70 by weight, vinyl content 40% and Mw 70,000) is transferred into a 1 liter steel reactor of the Buchi type. When the solvent used for the dilution or dissolution of the rubber is cyclohexane, purified/anhydrified with the use of molecular sieves 3 Å/5 Å (average water content of about 10 ppm, value determined by means of a Karl/Fisher titrator), a scavenger of protic impurities is thus added to the polymeric solution, in a maximum amount of 1 mmole/l (impurity scavengers to be used are those cited in literature, preferably $Al(i-C_4H_9)_3$, in short $Al(i-Bu)_3$). If, on the other hand, the solvent used for the dilution/dissolution of the SBS rubber is an HPCL grade solvent, purified/anhydrified by distillation on $LiAlH_4$ (with an average water content of about 2 ppm, value determined by means of a Karl-Fisher titrator), then it is not necessary to use a protic impurity scavenger. The mixture is stirred at 1,000 rpm. Hydrogen is then charged at a pressure of 4 bars and the temperature is thermostat-regulated at the desired value. The catalyst, dissolved in 10 ml of dry cyclohexane (anhydrified by distillation on $LiAlH_4$) is introduced into the reactor, in the amount specified in the tables. The hydrogen pressure in the reactor is brought to the desired value. The results obtained are listed in Tables 2–8.

3) Hydrogenation Reaction of SIS Rubbers

The same procedure is adopted as in the previous examples, but using a polymeric solution of SIS (with the following characteristics: percentage composition styrene butadiene 30/70 by weight and Mw 50,000). The results are indicated in Table 9.

Comments on the Tables

Table 1

Table 1 indicates the results of the hydrogenation tests of 400 g of a living polymeric solution of SBS at 8% in cyclohexane (characteristics: percentage composition styrene butadiene 30/70 by weight, vinyl content 40% and Mw 70,000), used as such without any termination/quenching reaction with a killer, using catalysts A, B, C, E in amounts equal to 100 ppm of titanium with respect to the dried polymer. These catalysts lead to a 99% hydrogenation of the polymer after 30 minutes, proving to be active without the presence of co-catalysts.

Table 2

Table 2 indicates the results of hydrogenation tests on SBS rubber solutions at different concentrations, with catalysts A, G, F in such quantities as to have 100 ppm of titanium with respect to the dried polymer. The various polymeric solutions are obtained by using, for the dilution/dissolution of the rubber, an HPCL grade solvent purified and anhydrified by distillation on $LiAlH_4$. The water content in the solvent was determined by means of a Karl Fisher titrator. If the residual water content in the solvent (see examples 2 and 3 where $H_2O=0.039$ mmoles) is decidedly lower than the amount of catalyst (A) (0.1 and 0.094 mmoles, respectively), then the catalyst can be used alone, without the need for an impurity scavenger, and a good hydrogenation degree of the rubber is obtained. In example 1 it can be seen that, if the water amount in the solvent (0.041 mmoles) is close to the quantity of catalyst (A) used (0.067 mmoles), then the rubber hydrogenation after 30 minutes is only 63%, due to the fact that the water present breaks up a certain amount of catalyst. If an impurity scavenger $Al(i-C_4H_9)_3$ (0.1 mmoles) is added (see example 4), under the same reaction conditions, the hydrogenation degree after 30 minutes reaches 99%. Another impurity scavenger which can be used is $Mg(Bu)_2$, which however proves to be less efficient with respect to $Al(i-C_4H_9)_3$ (see examples 5 and 4, respectively). The use of an excess of impurity scavenger is not only not necessary, but can even be harmful (examples 6 and 7) leading to a lower hydrogenation degree.

Similar results can be obtained with compounds G and F (see examples 8–11 of Table 2).

Table 3

Table 3 indicates the results of the hydrogenation tests of SBS rubber solutions (characteristics: percentage composition styrene butadiene 30/70 by weight, vinyl content 40% and Mw 70,000), at different concentrations (solutions obtained using, for the dilution/dissolution of the rubber, a solvent purified and anhydrified by means of molecular sieves 3 Å/5 Å). The water content in the solvent was determined by means of a Karl Fisher titrator. All the tests were carried out using a quantity of catalyst (A) which was such as to have a quantity of titanium of 100 ppm with respect to the dried polymer. From example 4 it can be seen that, if the water amount in the solvent (0.21 mmoles) is higher than the amount of the catalyst used (0.067 mmoles), then the hydrogenation of the rubber after 30 minutes is only 22% due to the fact that the water present breaks up a certain amount of catalyst. If an impurity scavenger $Al(i-C_4H_9)_3$ (0.3 mmoles) is added (see example 1), under the same reaction conditions, the hydrogenation degree after 30 minutes reaches 98%. Another impurity scavenger which can be used is $Mg(Bu)_2$, which proves however to be less efficient than $Al(i-Bu)_3$ (compare examples 2 and 1, respectively). The use of an excess of impurity scavenger is not only not necessary, but can even be harmful (compare examples 3 and 1) leading to a lower hydrogenation degree (90%).

Table 4

Table 4 indicates the results of hydrogenation tests of SBS rubber solutions (characteristics: percentage composition styrene butadiene 30/70 by weight, vinyl content 40% and Mw 70,000), at different concentrations (solutions obtained using, for the dilution/dissolution of the rubber, a HPLC grade solvent, purified and anhydrified by means of distillation on $LiAlH_4$) and using catalysts B and E without an impurity scavenger. Catalysts B and E, which differ in the number of isoprenyl units present in the alkenyl chain, show analogous behaviour, under the same reaction conditions (see examples 3 and 5). Both catalysts suffer from the water content in the reaction solvent (compare examples 2 and 3 for catalyst B and 4 and 5 for catalyst E). With the same water content in the reaction medium (0.039 mmoles), the hydrogenation degree passes from 97% to 93–94%, if the catalyst content is lowered from 0.1 mmoles to 0.094 mmoles. In example 1 it can be seen that if the water content in the solvent (0.041 mmoles) is close to the amount of catalyst (B) used (0.067 mmoles), then the rubber hydrogenation after 30 minutes is only 63%, as the water present breaks up a certain amount of catalyst.

Table 5

Table 5 indicates the results of the hydrogenation tests of SBS rubber solutions at different concentrations (8% and 12.5%) with catalyst C in such a quantity as to have 100 ppm of titanium with respect to the dried polymer. The two polymeric solutions are obtained using for the dilution/dissolution of the rubber, an HPLC grade solvent, purified and anhydrified by means of distillation on $LiAlH_4$. The water content in the solvent was determined by means of a Karl Fisher titrator. In example 1, as the quantity of titanium used (0.067 mmoles) is close to the amount of water in the solvent (0.041 mmoles), $Al(i-Bu)_3$ is used as scavenger (0.1 mmoles), obtaining an hydrogenation degree of 99% after 30 minutes. In example 2, as the rubber solution is more concentrated and the water amount in the solvent is therefore lower (0.039 mmoles) with respect to the amount of titanium used (0.1 mmoles), a scavenger is not used, and a hydrogenation degree of 98% is obtained after 30 minutes.

Table 6

Table 6 indicates the results of hydrogenation tests of SBS rubber solutions at different concentrations (8% and 12.5%) with catalyst D in such a quantity as to have 100 ppm of titanium with respect to the dried polymer. The two polymeric solutions are obtained using, for the dilution/dissolution of the rubber, an HPLC grade solvent, purified and anhydrified by means of distillation on $LiAlH_4$. The water content in the solvent was determined by means of a Karl Fisher titrator. Compound D, which is a trialkylated mono-metallocene, proved to be a less efficient catalyst as, after 30 minutes, it leads to a hydrogenation degree of 69% in the presence of $Al(i-Bu)_3$, whereas, in the absence of a scavenger, it produces a hydrogenation degree of 62%.

Table 7

Table 7 indicates the results of hydrogenation tests of SBS rubbers using catalyst A, 3 months, 6 months and 12 months after its preparation, in order to evaluate the stability of said catalyst over a period of time. Catalyst A was preserved, after its preparation, in a Schlenk tube under an argon atmosphere. The tests at different aging times provide an analogous result (H.D.≈97–98% after 30') and comparable with the value (H.D.=98%) obtained using catalyst A immediately after its preparation (see example 2 of Table 2).

Table 8

Table 8 indicates the temperature effect on the hydrogenation reaction of SBS rubbers using catalyst A. With an increase in temperature, the other conditions remaining the same, there is an increase in the hydrogenation rate, passing from an H.D.=70% after 30 minutes with T=80° C., to an H.D.=99% with T=130° C.

Table 9

Table 9 indicates the results of hydrogenation tests of cyclohexane solutions of SIS rubbers (characteristics: percentage composition styrene/diene 30/70 by weight and Mw 50,000) at different concentrations (7.5%, 8% and 12.5% by weight) and at different hydrogen pressures, at a temperature of 130° C., with catalyst A in such a quantity as to have 200 ppm of titanium with respect to the dried polymer. The polymeric solutions are obtained using, for the dilution/dissolution of the rubber, an HPLC grade solvent, purified and anhydrified by means of distillation on $LiAlH_4$. The water content in the solvent was determined by means of a Karl Fisher titrator. With an increase in the hydrogen pressure, an increase in the hydrogenation degree is observed, which, after 120 minutes, passes from 64% at a hydrogen pressure of 8 bar, to 92% for P=24 bar.

TABLE 1

Hydrogenation of SBS rubbers

| Test | Comp. | Polymeric solution (g) | Polymeric concentration (weight %) | Titanium mg | Titanium mmoles | Scavenger type | Scavenger mmoles | H.D. diene phase (%) 30' |
|---|---|---|---|---|---|---|---|---|
| 1 | A | 400 | 8 | 3.2 | 0.067 | — | — | 99 |
| 2 | B | 400 | 8 | 3.2 | 0.067 | — | — | 99 |
| 3 | C | 400 | 8 | 3.2 | 0.067 | — | — | 99 |
| 4 | E | 400 | 8 | 3.2 | 0.067 | — | — | 99 |

SBS polymer (styrene 30%, diene 70%) in cyclohexane; catalyst used in such an amount as to have 100 ppm of Ti with respect to the dried polymer, T=100° C., $P_{H2}$=8 bar, H.D. styrene phase at the end of the reaction <1.

TABLE 2

Hydrogenation of SBS rubbers

| Test | Comp. | Polym. solution (g) | Polym. conc. (weight %) | $H_2O$ in solv.* mmol. | Titanium mg | Titanium mmol | Scavenger type | Scavenger mmol | H.D. diene phase (%) 30' |
|---|---|---|---|---|---|---|---|---|---|
| 1 | A | 400 | 8 | 0.041 | 3.2 | 0.067 | — | — | 63 |
| 2 | A | 400 | 12.5 | 0.039 | 5.0 | 0.1 | — | — | 98 |
| 3 | A | 600 | 7.5 | 0.039 | 4.5 | 0.094 | — | — | 99 |
| 4 | A | 400 | 8 | 0.041 | 3.2 | 0.067 | Al(i-Bu)$_3$ | 0.1 | 99 |
| 5 | A | 400 | 8 | 0.041 | 3.2 | 0.067 | Mg(Bu)$_2$ | 0.1 | 78 |
| 6 | A | 400 | 8 | 0.041 | 3.2 | 0.067 | Mg(Bu)$_2$ | 0.5 | 38 |
| 7 | A | 400 | 8 | 0.041 | 3.2 | 0.067 | Al(i-Bu)$_3$ | 0.5 | 88 |
| 8 | G | 400 | 12.5 | 0.039 | 5.0 | 0.1 | — | — | 98 |
| 9 | G | 600 | 7.5 | 0.039 | 4.5 | 0.094 | — | — | 96 |
| 10 | F | 400 | 8 | 0.041 | 3.2 | 0.067 | — | — | 58 |
| 11 | F | 400 | 8 | 0.041 | 3.2 | 0.067 | Al(i-Bu)$_3$ | 0.15 | 99 |

*$H_2O$ content in the solvent measured by means of a Karl Fisher titrator. The solvent (cyclohexane) is purified by distillation on LiAlH$_4$.

SBS polymer (30% styrene, 70% diene) in cyclohexane; catalyst used in such a quantity as to have 100 ppm of Ti with respect to the dried polymer, T=100° C., $P_{H2}$=8 bar.
H.D. styrene phase at the end of the reaction <1.

TABLE 3

Hydrogenation of SBS rubbers

| Test | Comp. | Polym. solution (g) | Polym. conc. (weight %) | $H_2O$ in solv.* mmol. | Titanium mg | Titanium mmol | Scavenger type | Scavenger mmol | H.D. diene phase (%) 30' |
|---|---|---|---|---|---|---|---|---|---|
| 1 | A | 400 | 8 | 0.21 | 3.2 | 0.067 | Al(i-Bu)$_3$ | 0.3 | 98 |
| 2 | A | 400 | 12.5 | 0.195 | 5.0 | 0.1 | Mg(Bu)$_2$ | 0.3 | 80 |
| 3 | A | 600 | 7.5 | 0.195 | 4.5 | 0.094 | Al(i-Bu)$_3$ | 0.5 | 90 |
| 4 | A | 400 | 8 | 0.21 | 3.2 | 0.067 | — | — | 22 |

*The solvent (cyclohexane) is purified/anhydrified by means of distillation on LiAlH$_4$ (water content measured by means of a Karl Fisher titrator.

SBS polymer (30% styrene, 70% diene) in cyclohexane; catalyst used in such a quantity as to have 100 ppm of Ti with respect to the dried polymer, T=100° C., $P_{H2}$=8 bar.
H.D. styrene phase at the end of the reaction <1.
H.D. styrene phase at the end of the reaction <1.

TABLE 4

Hydrogenation of SBS rubbers

| Test | Comp. | Polym. solution (g) | Polym. conc. (weight %) | H$_2$O in solv. mmol. | Titanium mg | Titanium mmol | Scavenger type | Scavenger mmol | H.D. diene phase (%) 30' |
|---|---|---|---|---|---|---|---|---|---|
| 1 | B | 400 | 8    | 0.041 | 3.2 | 0.067 | — | — | 60 |
| 2 | B | 400 | 12.5 | 0.039 | 5.0 | 0.1   | — | — | 93 |
| 3 | B | 600 | 7.5  | 0.039 | 4.5 | 0.094 | — | — | 97 |
| 4 | E | 400 | 12.5 | 0.039 | 5.0 | 0.1   | — | — | 94 |
| 5 | E | 600 | 7.5  | 0.039 | 4.5 | 0.094 | — | — | 97 |

SBS polymer (30% styrene, 70% diene) in cyclohexane; catalyst used in such a quantity as to have 100 ppm of Ti with respect to the dried polymer, T=100° C., P$_{H2}$=8 bar.

The solvent (cyclohexane) is purified/anhydrified by distillation on LiAlH$_4$. (H$_2$O content in the solvent measured by means of a Karl Fisher titrator).

H.D. styrene phase at the end of the reaction <1.

TABLE 5

Hydrogenation of SBS rubbers

| Test | Comp. | Polym. solution (g) | Polym. conc. (weight %) | H$_2$O in solv.* mmol. | Titanium mg | Titanium mmol | Scavenger type | Scavenger mmol | H.D. diene phase (%) 30' |
|---|---|---|---|---|---|---|---|---|---|
| 1 | C | 400 | 8    | 0.041 | 3.2 | 0.067 | Al(i-Bu)$_3$ | 0.1 | 99 |
| 2 | C | 400 | 12.5 | 0.039 | 5.0 | 0.1   | — | — | 98 |

*The solvent is purified and anhydrified by distillation on LiAlH$_4$. (H$_2$O content measured by means of a Karl Fisher titrator);

SBS polymer (30% styrene, 70% diene) in cyclohexane; catalyst used in such a quantity as to have 100 ppm of Ti with respect to the dried polymer, T=100° C., P$_{H2}$=8 bar.

H.D. styrene phase at the end of the reaction <1.

TABLE 6

Hydrogenation of SBS rubbers

| Test | Comp. | Polym. solution (g) | Polym. conc. (weight %) | H$_2$O in solv.* mmol. | Titanium mg | Titanium mmol | Scavenger type | Scavenger mmol | H.D. diene phase (%) 30' |
|---|---|---|---|---|---|---|---|---|---|
| 1 | D | 400 | 8    | 0.041 | 3.2 | 0.067 | Al(i-Bu)$_3$ | 0.1 | 69 |
| 2 | D | 400 | 12.5 | 0.039 | 5.0 | 0.1   | — | — | 62 |

*The solvent is purified by distillation on LiAlH$_4$. (H$_2$O content measured by means of a Karl Fisher titrator).

SBS polymer (30% styrene, 70% diene) in cyclohexane; catalyst used in such a quantity as to have 100 ppm of Ti with respect to the dried polymer, T=100° C., P$_{H2}$=8 bar.

H.D. styrene phase at the end of the reaction <1.

TABLE 7

Hydrogenation of SBS rubbers using an aged catalyst

| Test | Aging (months) | Polym. solution (g) | Polym. conc. (weight %) | H₂O in solv. mmol. | Titanium mg | Titanium mmol | Scavenger | H.D. diene phase (%) 30' |
|---|---|---|---|---|---|---|---|---|
| 1 | 3 | 400 | 12.5 | 0.039 | 5.0 | 0.1 | — | 97 |
| 2 | 6 | 400 | 12.5 | 0.039 | 5.0 | 0.1 | — | 98 |
| 3 | 12 | 400 | 12.5 | 0.039 | 5.0 | 0.1 | — | 98 |

All the tests were carried out using the complex called "A".

SBS polymer (30% styrene, 70% diene) in cyclohexane; catalyst used in such a quantity as to have 100 ppm of Ti with respect to the dried polymer, T=100° C., $P_{H2}$=8 bar. Solvent purified by distillation on LiAlH$_4$. (H$_2$O content measured by means of a Karl Fisher titrator).

H.D. styrene phase at the end of the reaction <1.

TABLE 8

Hydrogenation of SBS rubbers Temperature effect in the absence of a scavenger

| Test | T° C. | Polymer solution (g) | Polymer conc. (weight %) | Titanium mg | Titanium mmol | H.D. of the diene phase (%) 30' | H.D. of the diene phase (%) 60' |
|---|---|---|---|---|---|---|---|
| 1 | 80 | 400 | 12.5 | 5.0 | 0.1 | 70 | 98 |
| 2 | 130 | 400 | 12.5 | 5.0 | 0.1 | 99 | 99 |

Compound A was always used in these tests. The water content in the solvent is always 2 ppm (0.039 mmoles). SBS polymer (30% styrene, 70% diene) in cyclohexane; catalyst used=100 ppm with respect to the dried polymer, $P_{H2}$=8 bar.

Solvent purified by distillation on LiAlH$_4$. (H$_2$O content measured by means of a Karl Fisher titrator).

H.D. styrene phase at the end of the reaction <1.

TABLE 9

Hydrogenation of SIS rubbers

| Test | P (tot) bar | Comp. | Polymeric solution (g) | Polymeric concentration (weight %) | H₂O in solvent mmoles | Titanium mg | Titanium mmoles | H.D. diene phase (%) 120' |
|---|---|---|---|---|---|---|---|---|
| 1 | 24 | A | 400 | 8 | 0.041 | 6.4 | 0.14 | 92 |
| 2 | 12 | A | 400 | 12.5 | 0.039 | 10.0 | 0.2 | 83 |
| 3 | 8 | A | 600 | 7.5 | 0.039 | 9.0 | 0.19 | 64 |

SIS polymer (30% styrene, 70% diene, MW 50,000) in cyclohexane; catalyst used equal to 200 ppm of Ti with respect to the dried polymer, T=130° C.; scavenger absent.

Solvent purified by means of distillation on LiAlH$_4$ (water content measured by means of a Karl Fisher titrator);

H.D. styrene phase at the end of the reaction <1.

What is claimed is:

1. A process for the hydrogenation of olefin double bonds present in polymers and copolymers of conjugated dienes, which oomprises putting said polymer or copolymer of conjugated dienes in contact with hydrogen, in an inert solvent and in the presence of a catalytic system, wherein said catalytic system esentially consists of one or more titanium compounds defined by formula (I)

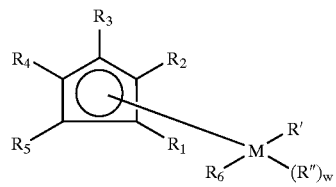

(I)

wherein:

M is selected from Ti(III), Ti(IV), or combinations thereof;

R" is selected from (i) an organic or inorganic radical of an anionic nature, different from cyclopentadienyl or cyclopentadienyl substituted, or (ii) an oligomeric group having general formula (II);

the groups $R_1$, $R_2$, $R_3$, $R_4$, $R_5$, each independently represent atoms or radicals linked to the cyclopentadienyl group coordinated to the metal M, and are selected from hydrogen, organic substituent of said cyclopentadienyl group;

$R_6$ is selected from: (a) an inorganic anion, (b) a hydrocarbyl group having from 1 to 20 carbon atoms, or (c) R';

"w" has the value of 0 or 1, according to the valence of Titanium;

R' consists of an oligoiueric group having the following formula (II):

(II)

wherein:

A represents any monomeric unit derived from a vinylaromatic group polymerizable by means of anionic polymerization, having from 6 to 20 carbon atoms;

D represents any monomeric imit derived from a conjugated diolefin polymerizable by means of anionic polymerization, having from 4 to 20 carbon atoms;

U represents any generic optional-monomeric unit derived from an unaaUnted compound co-polymerizable with any of the above-mentioned conjugated diolefins D or vinylaromatic compounds A;

$R^I$ represents a hydrocarbyl group having from 1 to 20 carbon atoms, any index "x" and "y" can be independently zero or an integer, provided the sum (x+y) is equal to or higher than 2;

"z" can be zero or an integer between 1 and 20.

2. The process according to claim 1, wherein the hydrocarbyl group (b) of $R_6$ is a substituted or uasubstituted cyclopentadiene.

3. The process according to claim 1, wherein the D-type monomeric units in formula (II) derived from 1,3 diolefins having from 4 to 20 carbon atoms.

4. The process according to claim 3, wherein said 1,3 diolefin is selected from the group consisting of 1,3-butadiene, isoprene, 1,3-pentadiene, 2-methyl-1,3-pentadiene, 1,3-hexadiene, and combinations thereof.

5. The process according to claim 4, wherein the 1,3-diolefin is selected from the group consisting of 1,3-butadiene, isoprone, and combinations thereof.

6. The process according to claim 1, wherein the monomeric units of the A-type in formula (II) are vinylaromatic compounds selected from the group consisting of styrene, α-methylstyrene, p-methylstyrene, vinyl naphthalene, and combinations thereof.

7. The process according to claim 6, wherein the vinylaromatic compound is styrene.

8. The process according to claim 1, wherein the sum (x+y) ranges from 2 to 50.

9. The process according to claim 1, wherein "z" in formula (II) is equal to zero.

10. The process according to claim 1, wherein "x" and "z" in formula (II) are both zero and the group R' consists of ait oligomer of the conjugated diene D having an average polymerization degree ranging from 2 to 15.

11. The process according to claim 1, wherein the group $R^I$ in formula (II) represents an aliphatic, cycloaliphatic aromatic or alkyl aromatic group having from 2 to 10 carbons atoms.

12. The process according to claim 11, wherein $R^I$ is selected from the group consisting of tert-butyl, n-butyl, isopropyl, and combinations thereof.

13. The process according to claim 1, wherein U Is selected from the group consisting of an acrylic enter, a methacrylic eater, and combinations thereof.

14. The Process according to claim 1, wherein the compound defined by formula (I) is selected from the group consisting of $Cp_2Ti[(C_5H_8)_2C_4H_9]$,
$Cp_2Ti[(C_5H_8)_2C_4H_9]_3$,
$Cp_2Ti[(C_5H_8)_5C_4H_9]$,
$Cp_2Ti[(C_5H_8)_5C_4H_9]$,
$Cp_2Ti[(C_5H_6)_5C_4H_9]$, and combinations thereof.

15. The process according to claim 1, wherein said process is carried out at a temperature ranging from 20° C. to 200° C. and a pressure of 1 to 50 bar.

16. The process according to claim 15, wherein the temperature ranges ifom 70° C. to 160° C.

17. The process according to claim 1, wherein the catalyst defined by formula (I) is present in quantities ranging from 50 to 150 ppm of titanium with respect to the (co)polymer to be hydrogenated.

18. The process according to claim 1, wherein the inert solvent contains a protic impurity scavenger in a maximum quantity of 1 mmole/l.

19. The process according to claim 18, wherein the scavenger is at least one aluminum alkyl.

20. The process according to claim 19, wherein the soavenger is $Al(i-C_4H_9)_3$.

21. The process according to claim 1, wherein the conjugated diene of the polymers are selected from the group consisting of 1,3-butadiene, isoprene, 2,3-dimethyl-1,3-butadien; 1,3-pentadiene, 2-methyl-1,3-pentadiene, 1,3-hexadiene, 4,5-diethyl-1,3-octadiene and 3-butyl-1,3-octadiene, and combinations thereof.

22. The process according to claim 21, wherein the conjugated dienes are selected from the group consisting of 1,3-butadiene, isoprene, and combinations thereof.

23. The process according to claim 1, wherein the copolymers of conjugated dienes are selected from copolymers between conjugated dienes and vinyl arenes.

24. The process according to claim 23, wherein the vinyl arene is styrene.

25. The process according to claim 23, wherein the copolymers of conjugated dienes are selected from the group consisting of styrene-isoprene-styrene rubber, and styrene-butudiene-styrene rubber, and combinations thereof.

* * * * *